Aug. 5, 1958   R. G. EISENHARDT   2,845,792
PNEUMATIC MEASURING APPARATUS
Filed Feb. 15, 1955

INVENTOR
Robert G. Eisenhardt
BY
ATTORNEY

United States Patent Office 2,845,792
Patented Aug. 5, 1958

2,845,792

PNEUMATIC MEASURING APPARATUS

Robert G. Eisenhardt, Upper Darby, Pa., assignor to Moore Products Co., Philadelphia, Pa., a corporation of Pennsylvania Application February 15, 1955, Serial No. 488,388

6 Claims. (Cl. 73—37.9)

This invention relates to pneumatic measuring apparatus and more particularly to such apparatus which is suitable for automatic sizing.

Pneumatic gages have heretofore been proposed, operating upon the principle that if a fluid under constant pressure is forced through upstream and downstream orifices in series with one another, the gaseous pressure in the space between the orifices will be a function of the relative sections of the orifices and the measurement of the gaseous pressure in the space will indicate the effective area of the discharge or downstream orifice, as varied by the position of the work with respect thereto, within certain limits. One of the factors affecting the speed of response is the volume of the space between the two orifices and even if this is kept small there is still an appreciable time interval required when a compressible medium, such as air, is employed, for the pressure to build up and become stable at an equilibrium value. Various other proposals have been made to improve the speed of systems of this type. In systems heretofore available, this time interval frequently was of the order of three tenths of a second and while this was suitable for ordinary manual gaging it is too slow where a pneumatic gage is employed for automatic sizing requiring a time interval of less than one tenth of a second for attaining equilibrium and making available the equilibrium pressure for control purposes.

In accordance with the present invention, improved arrangements are provided for increasing the speed of operation of a pneumatic gage.

In accordance with the present invention, and in order to increase the speed of operation, an auxiliary supply of pressure fluid is provided to the space between the orifices to maintain the pressure in that space at a level just below the gaging range and is shut off above that level.

In accordance with the present invention and in order to increase the speed of operation, a fluid pressure loaded reducing valve is employed, connected to deliver fluid to the space between the two orifices at a predetermined maximum pressure below the gaging range.

In accordance with the present invention, a fluid pressure loaded reducing valve is employed in connection with a pneumatic gaging circuit to provide results not heretofore capable of attainment.

Other objects and advantageous features of the invention will be apparent from the specification and claims.

The nature and characteristic features of the invention will be more readily understood from the following description, taken in connection with the accompanying drawings forming part thereof, in which.

Figure 1:
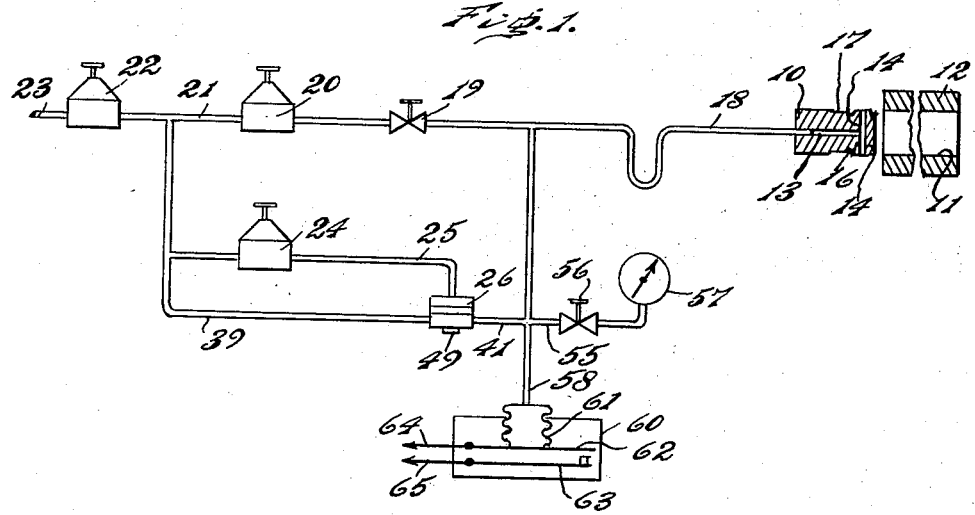
Figure 1 is a diagrammatic view of a gaging circuit in accordance with the invention and showing one form of control member.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, a gage plug of a well known type is shown at 10 for gaging the internal condition of the bore or opening 11 in a workpiece 12. The gage plug 10, shown merely by way of illustration, has an interior fluid delivery passageway 13 and branch passageways 14 providing opposed gaging nozzles with nozzle openings terminating at outer surfaces which may be below the exterior surface of the gage plug 10. Circular grooves 16 and escape slots 17 may be provided to permit of the free escape of the gaging fluid when the gage plug 10 is within the workpiece 12.

The passageway 13 is in communication through a pipe 18 with an adjustable upstream restriction or orifice 19 to which the output side of an adjustable pressure fluid regulator 20 is connected. The pressure fluid regulator 20, by suitable adjustment determines the pressure of the fluid supplied to the restriction 19 and therethrough to the pipe 18, and with the restriction 19, determines the gaging pressure range.

The pressure regulator 20 has the input portion thereof connected to a pipe 21 in which fluid under pressure is available, supplied if desired as pressure regulated air from a supply pressure fluid regulator 22, of the adjustable type, connected in turn to a supply pipe 23.

Figure 3:
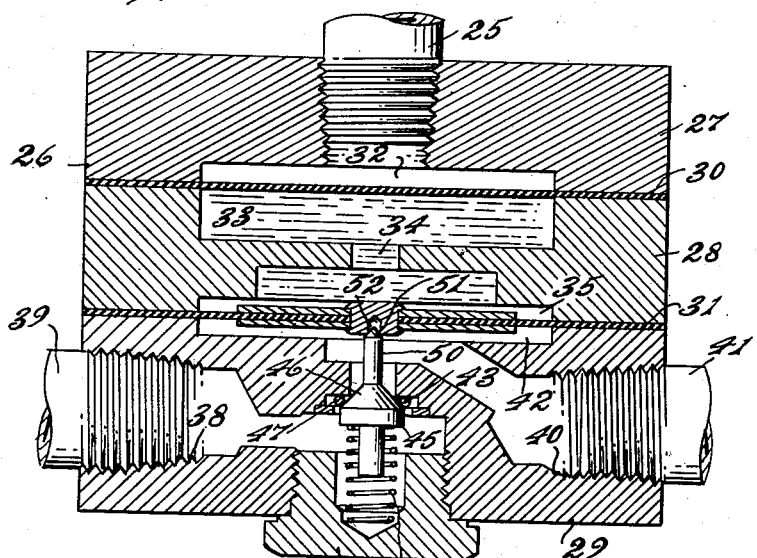
Fig. 3 is an enlarged central sectional view of a preferred form of relay employed in connection with the invention.

The pipe 21 also has connected thereto the input portion of an adjustable pressure fluid regulator 24 which is connected by a pipe 25 to a relay 26 which serves as a pressure reducing valve. The relay 26 as shown in more detail in Fig. 3, has three spaced casing portions 27, 28 and 29, held in assembled relation in any desired manner and with a flexible diaphragm 30 interposed between the casing portions 27 and 28 and a flexible diaphragm 31 interposed between the casing portions 28 and 29.

The casing portion 27 has the pipe 25 connected thereto and in communication with a fluid pressure chamber 32 therein, on the upper side of the diaphragm 30.

The casing portion 28 has a fluid pressure chamber 33 therein, on the lower side of the diaphragm 30, which is in communication through a restriction 34 with a chamber 35 which is in communication with the upper face of the diaphragm 31. The space in the chambers 33 and 35 and the restriction 34 therebetween is preferably liquid filled to provide for force transmission between the diaphragms 30 and 31 with a damping action provided by the restriction 34.

The casing portion 29 has a fluid inlet connection 38 connected by a pipe 39 to the pipe 21 and has a fluid delivery connection 40 connected by a pipe 41 to the pipe 18. The casing portion 29 has a chamber 42 on the lower side of the diaphragm 31 so that the output pressure is effective thereon, and has a valve seat 43 interposed between the inlet and delivery connections 38 and 40. A valve plug 45 is provided, having a frusto conical portion 46 for engagement with a resilient sealing ring 47, of neoprene or the like, to shut off fluid flow when in engagement therewith. The valve plug 45 is normally urged towards closed position by a spring 48 in engagement therewith and with a closure 49. The valve plug 45 also has a stem 50 with a pointed end 51 for engagement in a socket 52 carried by the diaphragm 31.

In order to calibrate the system, a fluid connection 55 may be provided, connected to the pipe 18, with a shut off valve 56, and pressure gage 57.

The pipe 18, either directly, or as shown through the pipe 41, is preferably connected to a pressure output pipe 58 for the delivery of a control fluid pressure which may be utilized in any desired manner for indication, for control or for other purposes.

The pipe 58 may be connected to any desired apparatus for transferring or transmitting a controlling pulse but, as shown on Fig. 1, is connected to a pressure responsive electric circuit control member 60.

The control member 60 has a flexible metallic bellows 61 to which the pipe 58 is connected and the bellows 61 carries an electric contact element 62 which is movable with respect to a contact element 63. The contacts 62 and 63 have conductors 64 and 65 connected thereto.

Figure 2:
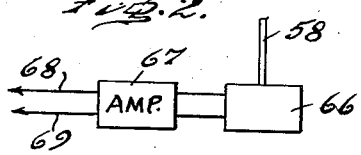
Fig. 2 is a fragmentary view similar to Fig. 1 showing a different form of pressure responsive control member.

As shown in Fig. 2, the pipe 58 may be connected to a fluid pressure responsive electric transducer 66 which is connected to an amplifier 67 for transmitting control signals through conductors 68 and 69 for control purposes.

The mode of operation will now be pointed out.

Gaging fluid, such as air under pressure, is supplied through the supply pipe 23 and the fluid pressure regulator 22 to the pipe 21. From the pipe 21, fluid under pressure is supplied through the regulator 20, the restriction 19 and the pipe 18 to the gaging plug 10 in the usual manner. Fluid under pressure is also supplied through the pipe 39, the relay 26 and the pipe 41 to the pipe 18 at a level determined by the setting of the pressure regulator 24 which through the pipe 25 applies a loading pressure on the relay 26. The loading pressure is such that whenever the pressure in the pipe 18 falls below a predetermined level which is slightly below the gaging range, the relay 26 is effective to supply the deficiency. The relay 26 must be, and as shown is, capable of supplying large flows for small drop in output pressure below the set pressure and have short response time constants so that it will reach equilibrium in a very short time after any change in conditions.

The relay 26 shuts off at a predetermined level, which is below the gaging pressure range, by the engagement of the valve plug portion 46 with the sealing ring 47.

The relay 26 must be stable and not tend to buzz, overshoot or oscillate upon being subjected to a sudden change of operating conditions. The liquid filling in the chambers 33 and 35 and the restriction 34 contribute greatly to the desired stability.

The pressure effective in the pipe 18, when in the gaging range, is available through the pressure output pipe 58 and is effective either in the control member 60 for moving the contact element 62 to contact closing position with respect to the contact element 63 or at the fluid pressure responsive electric transducer 66, for providing a control pulse or pulses.

I claim:

1. In measuring apparatus having a source of fluid under pressure, a fluid pressure regulator connected to said source, a gage member, a fluid connection between said fluid pressure regulator and said gage member, said gage member having a discharge opening controlled by a dimension of the work to be measured, flow limiting means interposed between said regulator and said gage member, a fluid pressure loaded valve connected to a source of fluid under pressure and having a delivery connection connected to the said fluid connection between said flow limiting means and said gage member for supplying pressure fluid to said fluid connection, and a pressure output connection connected to said first mentioned fluid connection.

2. Measuring apparatus as defined in claim 1 in which the pressure output connection is connected to a pressure responsive electric control member.

3. In measuring apparatus, a source of fluid under pressure, a fluid pressure regulator connected to said source, a gage member, a fluid connection between said fluid pressure regulator and said gage member, said gage member having a discharge opening controlled by a dimension of the work to be measured, flow limiting means interposed between said regulator and said gage member, a fluid pressure loaded valve connected to a source of fluid under pressure and having a delivery connection connected to the said fluid connection between said flow limiting means and said gage member for supplying pressure fluid to said fluid connection at a predetermined limit pressure, and a pressure output connection connected to said first mentioned fluid connection.

4. In measuring apparatus, a source of fluid under pressure, a fluid pressure regulator connected to said source, a gage member, a fluid connection between said fluid pressure regulator and said gage member, said gage member having a discharge opening controlled by a dimension of the work to be measured, flow limiting means interposed between said regulator and said gage member, a fluid pressure responsive valve having a supply connection connected to a source of fluid under pressure and having a delivery connection connected to the said fluid connection between said flow limiting means and said gage member for supplying pressure fluid to said fluid connection, said fluid pressure responsive valve having a control connection, a second fluid pressure regulator connected to said control connection for supplying a control pressure for said valve, and a pressure output connection connected to said first mentioned fluid connection.

5. In measuring apparatus, a source of fluid under pressure, a fluid pressure regulator connected to said source, a gage member, a fluid connection between said fluid pressure regulator and said gage member, said gage member having a discharge opening controlled by a dimension of the work to be measured, a restriction interposed between said regulator and said gage member, a fluid pressure responsive valve having a supply connection connected to said source and having a delivery connection connected to the said fluid connection between said restriction and said gage member for supplying pressure fluid to said fluid connection, said fluid pressure responsive valve having a control connection, a second fluid pressure regulator connected to said source and connected to said control connection for supplying a control pressure for said valve, and a pressure output connection connected to said first mentioned fluid connection.

6. In measuring apparatus, a source of fluid under pressure, a fluid pressure regulator connected to said source, a gage member, a fluid connection between said fluid pressure regulator and said gage member, said gage member having an orifice controlled by a dimension of the work to be measured, flow limiting means interposed between said regulator and said gage member, and a fluid pressure loaded relay connected to a source of loading fluid pressure, said relay having a control fluid connection to said first mentioned fluid connection between said flow limiting means and said gage member for supplying pressure fluid to said first mentioned fluid connection, said relay having members for controlling the pressure in said control fluid connection within a predetermined range.

References Cited in the file of this patent

UNITED STATES PATENTS

| | | |
|---|---|---|
| 2,359,236 | Moore | Sept. 26, 1944 |
| 2,486,052 | Moore | Oct. 25, 1949 |
| 2,538,622 | Johnson | Jan. 16, 1951 |
| 2,589,251 | Heinz | Mar. 18, 1952 |
| 2,651,317 | Heinz | Sept. 8, 1953 |
| 2,669,246 | Segerstad | Feb. 16, 1954 |
| 2,706,397 | Byrkett | Apr. 19, 1955 |
| 2,771,714 | Schmidt et al. | Nov. 27, 1956 |